Sept. 17, 1963   E. A. CRAIG ET AL   3,104,041
AUTOMOBILE COAT HANGER SUPPORT
Filed April 18, 1960
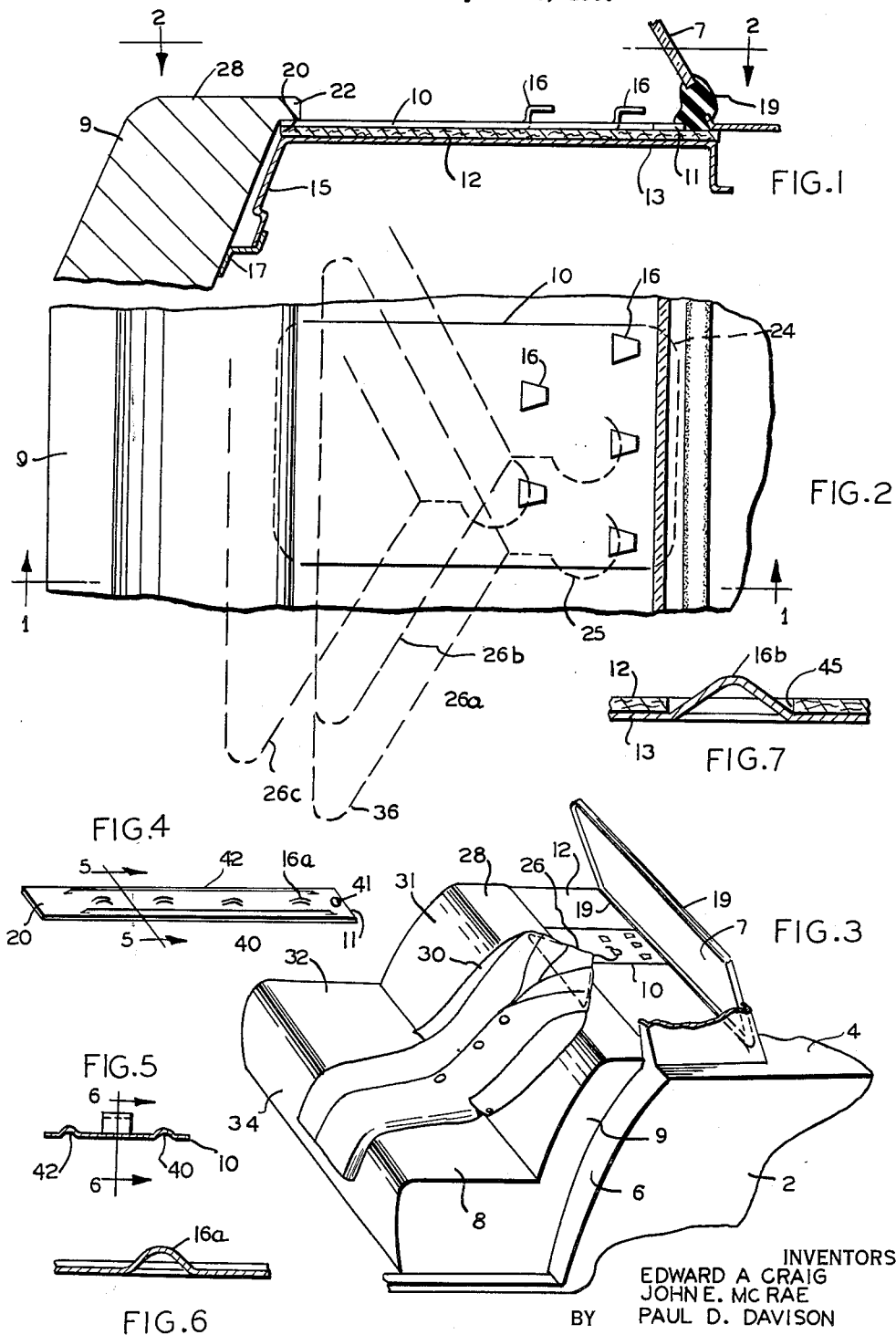
INVENTORS
EDWARD A CRAIG
JOHN E. MC RAE
BY  PAUL D. DAVISON
John E. McRae
ATTORNEY United States Patent Office 3,104,041
Patented Sept. 17, 1963

3,104,041
AUTOMOBILE COAT HANGER SUPPORT
Edward A. Craig, 96 W. Ferry, Detroit 2, Mich.; John E. McRae, 20338 Brookwood, Dearborn, Mich.; and Paul D. Davison, 727 N. Stephenson Highway, Royal Oak, Mich.
Filed Apr. 18, 1960, Ser. No. 22,826
3 Claims. (Cl. 224—29)

This invention relates to a device for orderly retaining clothing in non-wrinkled conditions on the rear seat portion of an automotive vehicle.

Customarily travellers journeying from place-to-place in automotive vehicles encounter a serious problem in maintaining clothing such as suits, dresses and coats in non-wrinkled conditions during their travels. Many expensive rack constructions have been provided in suitcases and trunks in attempts to eliminate this problem. However, the constructions have been relatively expensive, and the results have not been entirely satisfactory as regards the end objective of preventing wrinkles and fold marks in the clothing. Additionally, the devices have been relatively complicated and have in many cases been too difficult for the average traveller to understand sufficiently to permit of their convenient use. As a result in many cases the rack constructions have been left unused or have been discarded.

In an effort to overcome the above discussed disadvantages, several proposals have been made for utilizing the rear seat portion of an automotive vehicle as a storage space for the clothing. In one proposed arrangement there is provided an elongated rod, together with mounting portions at its opposite ends, the arrangement being such as to permit the rod to be positioned horizontally across the rear portion of the passenger compartment so as to provide a support structure for receiving hangers on which the clothing such as suits and dresses is supported. This arrangement is a fairly costly item, and suffers in operation because the driver's vision through the rear window is partially or totally obstructed, both by the horizontal rod itself and by the clothing suspended therefrom. A further disadvantage in connection with this arrangement resides in the fact that the space between the rod and the floor of the passenger compartment is insufficient to accommodate long dresses and coats without wrinkling of the fabric material.

In an effort to provide a lower cost construction there have been suggested various arrangements wherein one or more hooks are located adjacent the upper portion of the rear seat back structure. In these arrangements the hanger for the clothing is hooked onto the hook portions with the clothing extending downwardly against the seat back structure, thence forwardly on the surface of the seat, and thence downwardly to the floor. The hook structures are located forwardly of the rear limit of the seat back structure, and in many cases there is not sufficient space between the hook structures and the passenger compartment floor to accommodate long coats and dresses. Additionally, the hook structures have suffered in use because they have been mounted directly on the upper portion of the seat back structure, and in many cases the contour of the back structure has not permitted a secure and rigid mounting of the clothing support mechanisms. Additionally, the various makes and vintages of automobiles differ from one another in contour of the seat back structure so that it has not been possible to provide a single apparatus which would fit a variety of vehicles.

All of the previously discussed structures have suffered by reason of their relatively high manufacturing costs, and it is a general object of the present invention to provide an automotive vehicle clothing support having a relatively low manufacturing cost.

Another object of the invention is to provide an automotive vehicle clothing support which is capable of supporting relatively long garments such as coats and dresses without causing the garments to be draped onto the floor portion of the vehicle so as to be subject to wrinkling and soiling.

A further object of the invention is to provide a vehicle clothing support which may be easily installed within the vehicle, and which after installation is located so as not to interfere with the driver's vision through the rear window of the vehicle.

A further object of the invention is to provide a vehicle clothing support mechanism which occupies a relatively small space, and which when not in use does not interfere with comfortable seating of the passengers in the rear seat of the vehicle.

An additional object of the invention is to provide a vehicle clothing support which is devoid of such projections as might form a safety hazard for persons sitting on the rear seat of the vehicle.

A further object of the invention is to provide a vehicle clothing support mechanism which may be easily locked in a rigid, unyielding position within the vehicle, but which may be readily removed therefrom when desired.

Still another object of the invention is to provide a vehicle clothing support which may be utilized with various different vehicles having different seat back structure configurations.

Other objects of this invention will appear in the following description and appended claims, reference being had to the accompanying drawings forming a part of this specification wherein like reference characters designate corresponding parts in the several views.

In the drawings:

FIGURE 1 is a sectional view taken on line 1—1 in FIG. 2;

FIG. 2 is a sectional view taken on line 2—2 in FIG. 1;

FIG. 3 is a perspective view showing the FIG. 1 arrangement of parts on a reduced scale;

FIG. 4 is a perspective view of a clothing support structure which may be employed in the FIG. 3 arrangement as a replacement for the clothing support structure there shown;

FIG. 5 is an enlarged sectional view taken on line 5—5 in FIG. 4;

FIG. 6 is a sectional view taken on line 6—6 in FIG. 5; and

FIG. 7 is a sectional view showing a portion of a support structure employable as an alternate to the FIG. 1 and FIG. 4 embodiments.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings there is shown a rear fender portion of a vehicle body at 2 and a rear deck portion at 4. The space forwardly of the fender portion defines a door opening 6, and the conventional rear window extends across the rear deck, as at 7. There is provided the rear seat 8 with the conventional upstanding back structure 9, both of these structures being suitably padded and upholstered in the usual manner.

Extending horizontally in the space between back structure 9 and rear window 7 is the conventional shelf 12, said shelf being mounted in place by the usual metal framework indicated generally by numeral 13. It will be understood that this framework extends entirely across the width of the vehicle and is connected with the vehicle body and framework so as to form the rigid support for the shelf structure. The framework in the illustrated embodiment also serves as a device for retaining the seat back structure 9 in place, and for this purpose the framework is provided with the downwardly extending wall portion 15 which lockingly engages a series of clips 17 carried at laterally spaced points on the rear surface of the seat back structure.

As previously noted, it is a general object of the present invention to provide an improved clothing support. Accordingly as shown in FIG. 1 there is provided a clothing support which includes a base structure or plate 10, said plate being adapted to removably lie on the upper surface of shelf 12. By reference to FIG. 1, it will be seen that plate 10 is provided with the hook portions 16. These hook portions may if desired be formed separately from the plate and secured thereon by means of welding, riveting, gluing, etc. However, it is preferred for reasons of economy and rigidity to form these hooks integrally with the plate, as by striking the hook-forming portions upwardly out of the plane of the plate.

It will be noted that the plate is positioned on the shelf 12 with its rear edge portion 11 underlying the conventional rubber weatherstrip 19. The forward edge portion 20 of the plate underlies the rearwardly projecting portion 22 of the seat back structure 9. In most present-day vehicles the seat back structure is provided with a projecting extension such as projection 22, and this projection may be utilized to lock the forward portion of the plate 10 in place. By the design of the vehicle it is intended that projection 22 lie closely against the upper surface of shelf 12. However, the construction of the seat back 9, shelf 12, and supporting framework 13 is such that in practically all cases there is a clearance space for accommodating the forward portion of plate 10. Even in those few cases where it is not possible to slip the plate 10 into the space beneath projection 22, the plate may still be operatively mounted, since the conventional weatherstrip 19 provides a considerable space therebelow which may be utilized to lock the plate 10 at its rear edge portion. In such cases the forward edge portion of the plate can abut against the rear surface of the projecting portion 22 so that there is no displacement of the plate 10 under these conditions.

It will be noted that plate 10 is of lesser dimension laterally of the vehicle than longitudinally thereof. By this construction it becomes possible to more easily install the plate in position. Thus, the plate may be initially positioned flat against the shelf 12 in a location extending cross-wise of its FIG. 2 position, i.e., with its shortest dimension extending longitudinally of the vehicle. The plate may then be slipped or turned in a clockwise or counterclockwise direction so as to cause its front and rear edge portions to move into the clearance spaces beneath the structures 22 and 19. To better accommodate this sliding or turning movement the plate may be provided with the rounded corners 24, the rounding of the corners of course removing excess material from the plate such as would strike the surfaces of the vehicle in a manner to prevent the desired rotational movement.

If desired the FIG. 1 plate structure can be built of such materials and gage as will permit it to be resiliently flexed or bowed from its flat configuration. With such a construction the plate structure can be bowed manually prior to placement thereof on shelf 12. After placement of the bowed plate structure on the shelf the bowing force can be removed to permit the plate structure to snap to the flat configuration with its front and rear edges within the clearance spaces at 22 and 19. With this arrangement there is no need to round the plate corners as at 24.

By reference to FIG. 3 it will be seen that in the illustrated arrangement hook portions 16 receive the loop areas 25 of the conventional clothes hanger 26, with the major portion of the clothes hanger extending generally on the upper surface 28 of the seat back structure 9 so as to retain the men's overcoat 30 in a position draped downwardly on the front surface 31 of the seat back structure, thence forwardly along the upper surface 32 of the seat structure, and thence downwardly adjacent the forwardly facing surface 34 of the seat structure. It will be noted that with the FIG. 3 arrangement the bottom portion of the overcoat is located above the floor of the passenger compartment, and that the overcoat is retained in a substantially unwrinkled condition.

When the apparatus is utilized to retain longer garments such as ladies' evening gowns, in most cases there is still sufficient space to accommodate the clothing in a non-wrinkled condition. In this connection it will be noted that hooks 16 are located a very substantial distance rearwardly of the seat back structure 9 so as to provide the desired space in which to accommodate the clothing.

The hooks 16 as seen in FIG. 1 are located directly at the upper surface of the vehicle shelf 12 and in a horizontal plane at or below the upper limit of the back structure 9. By this arrangement the hooks are located entirely out of the driver's field of vision through the rear window 7. When the apparatus is in use the clothing 30 projects slightly above the surface 28 of the back structure 9. However, it has been found that this upward projection of the clothing is only a small portion of the total vertical dimension of the rear window and that the clothing does not obstruct the driver's field of vision, as in certain of the previous arrangements wherein the clothing support portions occupying the space above the level of the rear seat back structure.

FIG. 2 of the drawings shows plate 10 as having the hooks 16 arranged in a staggered relationship such that the shoulder-receiving portions 36 of the various clothes hangers 26a, 26b and 26c are spaced or staggered with respect to one another. This arrangement is of advantage in that the bulky shoulder portions of the various garments are prevented from directly engaging one another so as to give a bulky mass which might tend to obstruct the driver's vision or cause a shifting of the hangers and clothing out of retained positions engaged with the hooks. The clothing portions outside of the shoulder areas is of relatively small thickness, and by arranging the hooks 16 in the illustrated staggered arrangement a substantial number of coats and other bulky-shouldered garments can be readily positioned atop one another.

FIG. 2 illustrates a clothing support construction which is relatively low in cost. However, further reduction in cost may be achieved with the structure shown in FIGS. 4 through 6. As will be seen from FIG. 4, the structure comprises a relatively narrow elongated base structure or element having the reinforcing ribs 40 and 42 formed therein for substantially its entire length, the arrangement being such as to prevent twisting and buckling of the element in spite of its thin gage and small width laterally of the vehicle. The end portions 11 and 20 of the element are of course preferably flat so as to better fit into the above-mentioned clearance spaces provided by the vehicle portions 19 and 22.

In the FIG. 4 embodiment the hooks for the hangers are made as closed loops 16a as best shown in FIG. 6. These loops may be formed integrally with the main portion of the plate by striking operations in the same manner as the previously discussed loops 16. By utilizing closed loops as at 16a there is a lessened possibility of the clothes hanger working loose from the support mechanism since the closed character of the loops precludes any back and forth movement of the hanger (i.e., longitudinally of the vehicle). The use of closed loops as at 16a is further advantageous in that it so closely holds the hangers onto the plate 10a as to permit the plate and hangers to be removed from the installed position in the vehicle. By this arrangement the user is able to conveniently carry a large number of the stacked articles of clothing to and from the vehicle to the motels, hotels, or other places of temporary lodging which he may reside at during his travels. An opening 41 may be provided in the element to permit the entire assembly to be conveniently hung on the conventional hook structures usually found in the rooms of hotels and motels.

The devices shown in FIGS. 1 through 6 are formed as removable structures for temporary placement on the conventional vehicle shelf 12. Therefore the devices may be sold as attachment structures after sale of the automotive vehicle. In those cases where it is not felt desirable or necessary to remove the hanger clothing support from the vehicle the support structure may be formed as an integral part of the vehicle. For example, referring to illustrative FIG. 7, it is contemplated that during the manufacture of the vehicle portions of the framework 13 can be struck upwardly to form the hooks 16b, in which event suitable openings 45 are formed in the shelf 12 to accommodate the portions of the hooks extending therethrough. This integral arrangement has many of the advantages of the previously discussed removable arrangements. Additionally the integral arrangement has desired features of rigidity.

All of the contemplated arrangements are characterized by low cost, simplicity of installation, and optimum hook location. It will be understood that various modifications and rearrangements can be resorted to without departing from the spirit of the invention as set forth in the appended claims.

We claim:

1. In an automotive vehicle having a vehicle seat structure including a seat portion and a back portion, a rear window assembly spaced rearwardly of the seat back structure, and a shelf located between the seat back structure and window assembly; the improvement comprising a horizontally disposed elongated generally flat base structure having opposite terminal end portions abutting respectively against the seat back portion and rear window assembly for thereby taking a front-to-rear prone position supported entirely on the upper face of the aforementioned shelf, and a series of hanger-engageable structures located at horizontally spaced points along the length of the base structure and projecting upwardly therefrom, each of said hanger-engageable structures projecting from the base structure for a very limited vertical distance so as to be located at or below the plane of the seat back portion upper edge whereby to be out of the driver's line of vision through the vehicle rear window, and said base structure having the aforementioned terminal end portions firmly engaging the seat back portion and rear window assembly whereby the base structure is retained against pull out from the shelf.

2. In combination, a vehicle seat structure including a seat portion and a back portion; a rear window assembly spaced rearwardly of the seat back structure; a shelf located between the seat back structure and window assembly; said window assembly comprising a deformable weatherstrip located adjacent the rear limit of the shelf; and clothes hanger retention means comprising a horizontal plate means positioned flatwise on the upper surface of the shelf and having an edge portion thereof lockingly fitted into the space between the weatherstrip and shelf and having the opposite edge portion thereof abutting the seat back structure, said plate means having at least one hanger-engageable structure positioned adjacent the window assembly at or below the plane of the seat back portion upper edge so as to be out of the driver's line of vision through the vehicle rear wondiw.

3. In combination, a vehicle seat structure including a seat portion and a back portion; a rear window assembly spaced rearwardly of the seat back structure; a shelf located between the seat back structure and window assembly; and clothes hanger retention means comprising a horizontal plate means positioned flatwise on the upper surface of the shelf with opposite terminal portions thereof abutting against the seat back portion and rear window assembly, said plate means having at least one hanger-engageable structure positioned at or below the plane of the seat back portion upper edge so as to be out of the driver's line of vision through the vehicle rear window, and said plate means having the aforementioned terminal end portions firmly engaging the seat back portion and rear window assembly whereby the plate means is retained against pull out from the shelf.

References Cited in the file of this patent
UNITED STATES PATENTS

| | | |
|---|---|---|
| 2,157,001 | Morley | May 2, 1939 |
| 2,196,196 | Dorsey | Apr. 9, 1940 |
| 2,255,973 | Hoobler | Sept. 16, 1941 |
| 2,550,796 | Francis | May 1, 1951 |
| 2,947,457 | Lentz | Aug. 2, 1960 |